March 1, 1960  J. R. PRYBYLSKI ET AL  2,926,883
SHUT-OFF VALVE
Filed Jan. 3, 1957  2 Sheets-Sheet 1

INVENTORS
JOHN R. PRYBYLSKI
CLEMENT J. TURANSKY
BY
ATTORNEYS

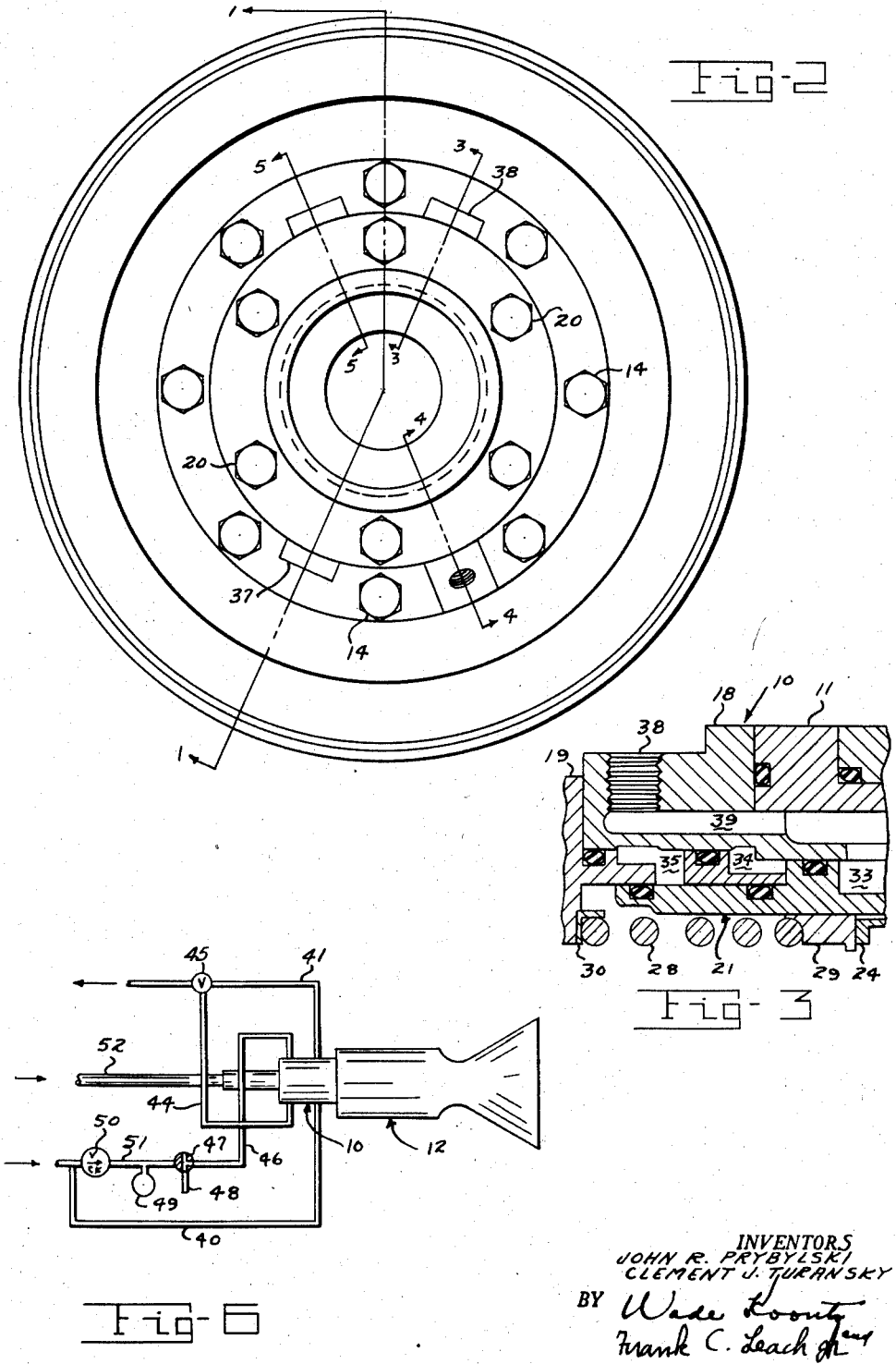

United States Patent Office 2,926,883
Patented Mar. 1, 1960

2,926,883

SHUT-OFF VALVE

John R. Prybylski, Buffalo, and Clement J. Turansky, Tonawanda, N.Y., assignors to the United States of America as represented by the Secretary of the Air Force Application January 3, 1957, Serial No. 632,403

2 Claims. (Cl. 251—30)

This invention relates to a shut-off valve and, more particularly, to a shut-off valve that positively stops the flow of fluid therethrough to prevent dripping of the fluid from the valve.

A danger in operating a rocket engine is the possibility of the fuel dripping from the injector head into the combustion chamber after shutdown. If sufficient fuel accumulates in the combustion chamber due to dripping from the injector head and such fuel comes into contact with the oxidizer, an explosion may result therefrom and possibly demolish the rocket engine. The shut-off valve of the present invention prevents the fuel from dripping into the combustion chamber after shutdown since it positively closes whenever it is desired to shutdown the engine.

Since rocket engines are employed to power aircraft, it is desirable that the weight of the engine be a minimum. In prior shut-off valves used with rocket engines, the large closing force of the movable portion of the valve has been exerted directly against the injector head of the combustion chamber. This requires the injector head to be made of a strong and heavy material to withstand this large closing force. The present invention eliminates this problem by employing a sleeve on the valve to absorb the closing force whereby the injector head may be made of a lightweight material.

In starting rocket engines, it is necessary to apply a start liquid to the thrust chamber to create combustion before the fuel propellant is injected. This start liquid is usually stored in the supply line between the fuel tank and the shut-off valve. A burst disc is employed to prevent the supply of the start liquid until it is desired to start the engine. If the burst disc should inadvertently rupture due to a build up of fuel tank pressure, for example, a shut-off valve, which responds to pressure flowing therethrough, would open even though it was not desired to start the engine. The present invention prevents this premature opening by not being responsive to the pressure flowing therethrough.

An object of the present invention is to provide a shut-off valve that rapidly stops fluid flow therethrough.

Another object of the present invention is to provide a valve that does not prematurely open due to a build up of pressure of the fluid flowing therethrough.

Other objects of the present invention will be readily perceived from the following description.

This invention relates to a valve including a housing having an inlet and an outlet. The fluid flow through the outlet from the inlet is controlled by movable means in the housing. The movable means is normally held in a closed position by resilient means. The resilient means is overcome and the movable means moved to an open position when fluid under pressure is supplied by suitable means to a chamber, which is formed between the movable means and the housing.

The attached drawings illustrate a preferred embodiment of the invention, in which—

Fig. 2 is an end elevational view of the shut-off valve of Fig. 1;

Fig. 3 is a sectional view taken along the line 3—3 of Fig. 2;

Fig. 6 is a schematic view of the shut-off valve of the present invention in conjunction with a thrust chamber of a rocket engine and the piping for the valve.

Figure 1:
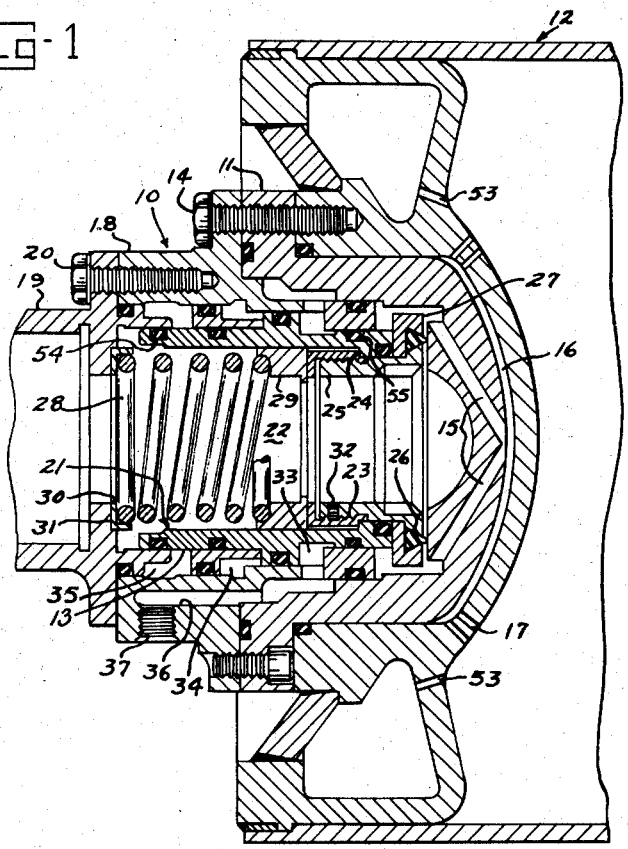
Fig. 1 is a sectional view of the shut-off valve of the present invention and taken substantially along the line 1—1 of Fig. 2.

Referring to the drawing and particularly Fig. 1, there is shown a valve housing 10 having a sleeve portion 11 attached to a container 12 such as a combustion chamber of a rocket engine, for example, by suitable means such as threaded bolts 14. The sleeve 11 has a plurality of outlet passages 15 (two of which are shown) connecting the interior of the valve housing 10 with the interior of the combustion chamber 12 through a space 16 between the sleeve 11 and the injector head of the combustion chamber 12 and a plurality of inlets 17 in the injector head of the combustion chamber 12.

The housing 10 includes a second portion 18, which is secured to the sleeve portion 11 and the combustion chamber 12 by the bolts 14. An inlet portion 19 through which fluid under pressure is supplied to the interior of the housing 10 is secured to the second portion 18 of the housing 10 by threaded bolts 20.

A movable piston assembly including a movable piston member 21 having a passage 22 extending therethrough is disposed within the interior of the housing 10 to control the flow of fluid from the inlet 19 to the outlets 15. The piston member 21 has an annular member 23 disposed within the interior thereof and abutting against a shoulder 24 of the piston member 21. A retainer 25 is threaded onto the annular member 23 to hold a packing 26 against an annular member 27, which is disposed against the end of the piston member 21. The packing 26 seals the outlets 15 from the passage 22 when the piston assembly is in its closed position.

Resilient means such as a spring 28 moves the piston member 21 to a normally closed position through an intermediate member 29 disposed within the interior of the piston member 21 and abutting against the annular member 23, which engages the shoulder 24 of the piston member 21. The other end of the spring 28 is held in position by a ring 30 disposed within a cut away portion 31 of the inlet portion 19. A set screw 32 holds the retainer 25 in its desired position on the annular member 23.

Between the piston member 21 and the valve housing 10, there is formed a plurality of chambers 33, 34 and 35 to which fluid is supplied to control the position of the piston member 21 with respect to the outlets 15. Fluid is supplied to the chamber 33 through a passage 36 and a port 37 in the valve housing 10. A second port 38 (see Figs. 2 and 3) communicates with the chamber 33 through a passage 39. Thus, fluid may flow through the port 37, the passage 36, the chamber 33, the passage 39 and the port 38. As is seen from Fig. 6, the fluid is supplied from a tank (not shown) through a line 40 to the port 37. The fluid flows from the port 38, after passing through the chamber 33, through a line 41, which is connected to the port 38, back to the tank. It will be understood that the tank, which supplies the fluid to the chambers 33, 34 and 35, also supplies the fluid passing through the interior of the housing of the valve. It is noted that the aforesaid chambers 34 and 35 are formed by means of a fast shut down piston indicated at 13 which forms the wall therebetween sealed as shown to the valve body 10 and telescopically positioned on the outer surface of the aforesaid piston member 21.

Figure 4:
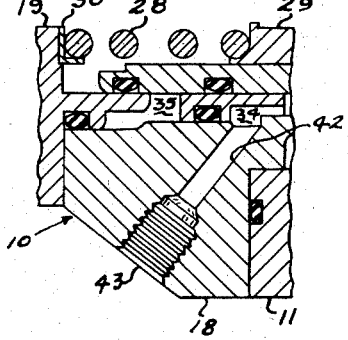
Fig. 4 is a sectional view taken along the line 4—4 of Fig. 2.

As shown in Fig. 4, the chamber 34 has fluid supplied through a passage 42 from a port 43, which is connected to a line 44 communicating with the line 41 (Fig. 6). A solenoid valve 45 (Fig. 6) is disposed in the line 41 at the connection of the line 44 to the line 41 to control flow of fluid into the line 44. When the solenoid valve 45 is open, the fluid flowing from the tank through the line 40, the port 37, the chamber 33, the port 38, and the line 41 flows through the line 44 into the chamber 34. Thus, the pressure in the chamber 34 is substantially the same pressure as in the chamber 33 so that the piston member 21 is balanced pressurewise and the force of the spring 28 retains the piston member 21 in its closed position to prevent flow through the outlets 15. When the normally open solenoid valve 45 is closed, there is no fluid flow through the line 44 to the chamber 34 and the fluid flowing from the tank through the line 40 is trapped within the chamber 33 by the closed valve 45 so that the pressure within the chamber 33 is sufficient to overcome the force of the spring 28 since there is no pressure existing within the chamber 34. Accordingly, the piston member 21 moves to an open position to permit fluid flow through the outlets 15 when the solenoid 45 is closed.

Figure 5:
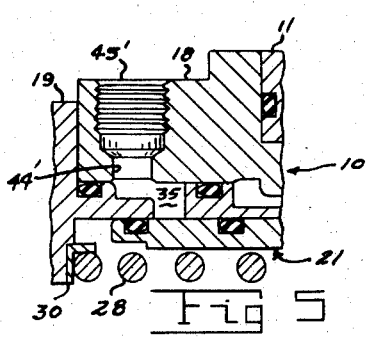
Fig. 5 is a sectional view taken along the line 5—5 of Fig. 2.

The third chamber 35 is normally vented to the atmosphere through a passage 44', a port 45' (see Fig. 5), a line 46 (see Fig. 6), a three-way solenoid valve 47, and an overboard line 48. If a fast shutdown is required due to an emergency while the piston member 21 is in its open position, fluid pressure is supplied to the chamber 35 from the accumulator 49. During normal operation of the device, a portion of the fluid flowing from the tank through the line 40 flows through a check valve 50 in a line 51 into the accumulator 49 connected thereto. Thus, pressure builds up within the accumulator 49 during the operation of the apparatus. Thus, when an emergency develops requiring a fast shutdown, it is only necessary to energize the three-way solenoid valve 47 to permit flow from the accumulator 49 through the lines 51 and 46, the port 45', and the passage 44' to the chamber 35 to act on the aforesaid fast shut down piston 13 to cause the latter to react against the piston member 21. This pressure is sufficient to combine with the force of the spring 28 to overcome the force exerted by the pressure within the chamber 33 to move the piston member 21 rapidly to its closed position.

Considering the operation of the present invention, a fluid such as liquid fuel for the combustion chamber of a rocket engine is supplied through a line 52 (see Fig. 6) from the tank and through the inlet 19 to the passage 22 of the valve housing 10. Fluid is also simultaneously circulated through the chambers 33 and 34 through the lines 40, 41 and 44 due to the solenoid valve 45 being open.

When it is desired to permit flow through the outlets 15, the normally open solenoid valve 45 is closed. This results in the fluid pressure within the chamber 33 building up while there is no pressure supplied to the chamber 34 so that the increased pressure in the chamber 33 produces a force sufficient to overcome the force of the spring 28 and move the piston member 21 whereby the fluid flows from the passage 22 through the outlets 15, the space 16, and the inlets 17 into the interior of the combustion chamber 12. In order for there to be combustion in the combustion chamber, an oxidizer also must be supplied to the combustion chamber. While this oxidizer could be mixed with the liquid fuel outside the combustion chamber if the two propellants were the type that may be mixed without combustion, the injector head of the combustion chamber 12 has a plurality of orifices 53 for the admission of an oxidizer to the interior of the combustion chamber 12.

If it is desired to stop combustion in the combustion chamber of the rocket engine, the supply of fuel thereto is stopped by moving the piston member 21 to its closed position. This is accomplished by deenergizing the solenoid valve 45 to open the valve whereby fluid flows through the chamber 33 and into the chamber 34 resulting in the pressure on both the front and back sides of the piston member 21 becoming equalized to balance the piston member 21 pressurewise. The force of the spring 28 then moves the piston member 21 to its closed position whereby the packing 26 abuts against the sleeve 11 to seal the outlets 15 from the passage 22. Thus, the flow of fluid is positively stopped. This quick closing of the outlets 15 prevents fuel from dripping into the combustion chamber 12 after the engine has been shutdown to thereby prevent an accumulation of fuel in the combustion chamber where it would come into contact with the oxidizer after shutdown to possibly create an explosion.

If an emergency develops such as the flame in the combustion chamber ceasing to exist, for example, it is necessary that the valve be rapidly closed. The three-way valve 47, which normally allows venting of the chamber 35 to the atmosphere through the lines 46 and 48, may be energized in response to any condition such as, for example, a predetermined pressure drop within the interior of the combustion chamber 12. Thus, if the flame in the combustion chamber 12 ceases to exist, for example, there would be a sudden reduction in pressure within the interior of the combustion chamber 12 and the solenoid valve 47 would be energized. This energization of the solenoid valve 47 allows the fluid pressure within the accumulator 49 to be transmitted through the lines 51 and 46 to the chamber 35. This increased pressure acting against the piston member 21 creates a force sufficient to combine with the force of the spring 28 to move the piston member 21 rapidly to its closed position despite the fact that fluid pressure existing within the chamber 33 is tending to keep the piston member 21 in its open position. This emergency shutdown device is used only when it is desired to rapidly close the valve due to unforeseeable conditions.

It should be noted that the valve is so designed that there is always a positive force acting on the piston member 21. In the closed position, the effective area across the packing 54, such as an O ring, is greater than the effective area across the portion of the retainer 25 inside of the packing 26. Thus, if any fluid pressure were inadvertently supplied to the passage 22 before it is desired to open the valve, the valve would remain closed due to the effective area across the packing 54 being greater; the valve would remain closed despite the pressure of the fluid within the passage 22 until the solenoid valve 45 was closed to increase the pressure within the chamber 33. In the open position, the effective area across the packing 54 is greater than the effective area across the packing 55, such as an O ring, so that whenever the pressure within the chamber 33 is removed by opening the valve 45, the pressure of the fluid within the passage 22 aids the spring 28 in moving the piston member 21 to its closed position.

While any fluid may be supplied to the chambers 33, 34 and 35, it is preferable in a rocket engine to use the fuel. While the operation of the valve has been described with reference to the combustion chamber of a rocket engine, it will be understood that this shut-off valve may be employed anywhere it is desired positively to stop fluid flow. Similarly, this valve housing may be employed whenever it is desired to stop fluid flow in response to some predetermined emergency condition.

An advantage of this invention is that it prevents the dripping of fuel into the combustion chamber of a rocket engine on shutdown whereby an explosion hazard or afterburning, which might damage the motor or its components, is prevented. In use with rocket engines, the valve has the advantage of reducing the weight of the engine since the forces resulting from the fast closing of the valve are absorbed by a portion of the valve rather than the injector so that lighter weight material such as aluminum rather than steel may be used in constructing the injector. Another advantage of the invention is that any unexpected fluid pressure build up within the valve housing will not prematurely open the valve.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

We claim:

1. A valve including a housing having an inlet and an outlet, movable means in the housing to control fluid flow through the outlet fom the inlet, and resilient means normally holding the movable means against the portion of the housing having the outlet to stop flow through the outlet from the inlet, said movable means and said housing having opposed reactor surfaces forming a pair of chambers therebetween, means to vary the pressure in each of said chambers, said movable means overcoming said resilient means to move to an open position in response to an increase in pressure against the reactor surfaces of said movable means in one of said chambers, said movable means being returned to its closed position by the resilient means when the pressure in said chambers is equalized said pressure-varying means comprising a first fluid passage incorporated within said housing in communication with said one of said chambers, an inlet port in communication with said first fluid passage, a first fluid line adapted to deliver fluid under pressure to said inlet port, an outlet port incorporated within said housing, a second fluid passage in communication with said outlet port and said one of said chambers, a second fluid line in communication with said outlet port, a third fluid passage incorporated within said housing in communication with the other of said chambers, a second inlet port in communication with said third fluid passage, an interconnecting fluid line between said second inlet port and said second fluid line, and a solenoid valve positioned at the connection between said interconnecting fluid line and said second fluid line delivering fluid under pressure to said other chamber to equalize the pressure in both chambers when in the open position and effect an increase of pressure in said first chamber when in closed position.

2. A valve according to claim 1, said movable means having an exteriorly disposed member telescopically positioned therearound and incorporating opposed reactor surfaces with the housing to form a third chamber therebetween, means to vary the pressure in said third chamber, said resilient means moving the movable means to its closed position in response to a pressure increase in the third chamber.

References Cited in the file of this patent

UNITED STATES PATENTS

| | | |
|---|---|---|
| 845,063 | Desper | Feb. 26, 1907 |
| 2,676,611 | Page | Apr. 27, 1954 |
| 2,725,891 | Bourguignon | Dec. 6, 1955 |
| 2,751,923 | Towler et al. | June 26, 1956 |
| 2,753,146 | Wiegers | July 3, 1956 |
| 2,799,466 | Hickerson | July 16, 1957 |

FOREIGN PATENTS

| | | |
|---|---|---|
| 585,032 | Great Britain | Jan. 29, 1947 |
| 1,054,190 | France | Oct. 7, 1953 |